United States Patent [19]

Scholz et al.

[11] Patent Number: 5,749,948
[45] Date of Patent: May 12, 1998

[54] EXPANDABLE, FLAME-RETARDANT COATING COMPOSITIONS

[75] Inventors: Guido Scholz, Cologne; Wolf-Dieter Pirig, Euskirchen, both of Germany

[73] Assignee: Hoechst Aktiengesellschaft, Frankfurt, Germany

[21] Appl. No.: 779,427

[22] Filed: Jan. 7, 1997

Related U.S. Application Data

[63] Continuation of Ser. No. 644,586, May 10, 1996, abandoned, which is a continuation of Ser. No. 350,821, Dec. 7, 1994, abandoned.

[30] Foreign Application Priority Data

Dec. 21, 1993 [DE] Germany ............... P 43 43 668.4

[51] Int. Cl.$^6$ ............... C09D 5/18; C09K 21/10; C09K 21/12
[52] U.S. Cl. ............... 106/18.15; 106/18.18; 252/601; 252/609; 524/147
[58] Field of Search ............... 106/18.15, 18.17, 106/18.18; 252/601, 609; 524/115, 147

[56] References Cited

U.S. PATENT DOCUMENTS

| 3,562,197 | 2/1971 | Sears et al. | 106/18.15 |
|---|---|---|---|
| 3,953,374 | 4/1976 | Windhager | 252/500 |
| 4,101,485 | 7/1978 | Brooks et al. | 106/18.15 |
| 4,118,443 | 10/1978 | Klose | 558/114 |
| 4,166,743 | 9/1979 | Wortmann et al. | 252/606 |
| 4,247,435 | 1/1981 | Kasten | 106/18.16 |
| 4,369,064 | 1/1983 | Von Bonin | 106/18.15 |
| 4,639,331 | 1/1987 | Elsner et al. | 106/18.15 |
| 4,908,160 | 3/1990 | Thacker | 106/18.17 |
| 4,971,728 | 11/1990 | Vandersall | 106/18.17 |
| 4,983,326 | 1/1991 | Vandersall | 106/18.15 |
| 5,049,187 | 9/1991 | Smith | 106/18.18 |
| 5,064,710 | 11/1991 | Gosz | 106/18.15 |

FOREIGN PATENT DOCUMENTS 0 468 259  1/1992  European Pat. Off. .

OTHER PUBLICATIONS

Derwent Database, JP45031689 (Jun. 1967).
*International Plastics Flammability Handbook*, 2nd Ed., New York, Oxford Univ. Press, 1990, pp. 52–53. (No Month).

*Primary Examiner*—Anthony J. Green
*Attorney, Agent, or Firm*—Connolly and Hutz

[57] ABSTRACT

The expandable, flame-retardant coating compositions comprise at least

- from 4 to 25% by weight of a film-forming binder,
- from 10 to 40% by weight of an ammonium polyphosphate,
- from 8 to 40% by weight of at least one substance which is carbonized under the effect of heat,
- from 6 to 25% by weight of an expansion agent,
- from 0 to 5% by weight of dispersants and
- from 0 to 25% by weight of fillers. As substance which is carbonized under the effect of heat and/or as expansion agent, and as additional acid donor, these coating compositions contain ammonium salts of alkyl phosphates.

4 Claims, No Drawings

EXPANDABLE, FLAME-RETARDANT COATING COMPOSITIONS

This application is a continuation of application Ser. No. 08/644,586 filed on May 10, 1996, abandoned which in turn is a continuation of Ser. No. 08/350,821, filed Dec. 7, 1994 now abandoned.

The present invention relates to expandable, flame-retardant coating compositions which comprise at least from 4 to 25% by weight of a film-forming binder, from 10 to 40% by weight of an ammonium polyphosphate, from 8 to 40% by weight of at least one substance which is carbonized under the effect of heat, from 6 to 25% by weight of an expansion agent, from 0 to 5% by weight of dispersants and from 0 to 25% by weight of fillers.

U.S. Pat No. 4,166,743 discloses expandable coating compositions comprising a film former, an ammonium polyphosphate, at least one substance which is carbonized under the effect of heat, a dispersant, a salt containing water of crystallization, an expansion agent and, if desired, fillers. The film formers in these compositions may be aqueous dispersions of polyvinyl acetate or of a copolymer of vinyl acetate and dibutyl maleate, whereas the substance which is carbonized is suitably dicyandiamide, pentaerythritol or melamine. Suitable dispersants, other than water, are ethyl acetate, butyl acetate, xylene or toluene, whereas chlorinated paraffins are used as expansion agent.

According to a new reference (cf. J. Troitsch: "International Plastics Flammability Handbook", 2nd. Edition, Oxford University Press, New York, 1990, pages 52 and 53) typical examples of substances which are carbonized are pentaerythritol and starch, whereas guanidines, for example cyanoguanidine (dicyandiamide), melamine and chlorinated paraffins are classed as expansion agents.

A disadvantage of the known expandable coating compositions is that they contain, in the expansion agent and/or in the substance which is carbonized under the effect of heat, organically bonded halogen, whereby corrosive and toxic gases are released as the coating compositions break down.

The object of the present invention is therefore to provide expandable coating compositions which possess flame-retardant properties but which break down without releasing halogen-containing compounds. This is achieved in accordance with the invention in that the coating compositions contain ammonium salts of alkyl phosphates as substance which is carbonized under the effect of heat and/or as expansion agent and as additional acid donor.

Furthermore, the coating compositions according to the invention may also, optionally, have compositions in which a) monoalkyl phosphates are present;
b) dialkyl phosphates are present;
c) the salts are hydroxyalkyl-substituted ammonium salts;
d) monoethanolamine is used as hydroxyalkyl-substituted ammonium;
e) diethanolamine is used as hydroxyalkyl-substituted ammonium;
f) triethanolamine is used as hydroxyalkyl-substituted ammonium;
g) the salts are alkyl-substituted ammonium salts;
h) the alkyl radical has 1 to 6 carbon atoms;
i) the salts are aryl-substituted ammonium salts.

The ammonium salts of alkyl phosphates which are present in the coating compositions according to the invention can be prepared, for example, by the process known from U.S. Pat. No. 4,118,443.

In the coating compositions according to the invention it is also possible for mixtures of monoalkyl phosphates and dialkyl phosphates to be present.

The ammonium salts of alkyl phosphates which are present in the coating compositions according to the invention do not only have a flame-retardant action but also give the compositions plasticizing properties. They therefore have a positive effect on the film tear resistance of the coating compositions which form the insulating layer, and can therefore be used as complete substitutes for chlorinated paraffins and other halogen-containing additives, for example tris(2-chloroethyl) phosphate (TCEP) or tris(2-chloroisopropyl) phosphate (TCPP).

In the examples below, flame-retardant coating compositions are prepared and their effectiveness is determined, the incorporated ammonium polyphosphate being Hostaflam AP 462 (from Hoechst AG, Frankfurt). The insulation efficiency of the intumescent paints prepared using these coating compositions was carried out in accordance with DIN 4102, part 2 (1977) in a small-scale test set-up according to DIN 4102, part 8 (1986), while the testing of the surface quality was carried out visually.

EXAMPLE 1 (COMPARATIVE EXAMPLE)

The following components were introduced in succession into a stirred vessel fitted with a dissolver disc:

20.8% by weight of water
3% by weight of ®Tylose
0.2% by weight of ®Lopon 890
4% by weight of titanium dioxide
12% by weight of pentaerythritol
24% by weight of ammonium polyphosphate
14% by weight of melamine
20% by weight of ®Mowilith DM 230
2% by weight of chlorinated paraffin 50, liquid.

The resulting coating composition was roller-coated onto one side of a steel panel (St 37) of dimensions 280×280×6 mm$^3$. After drying for one day at room temperature coating composition was again applied. The weight of the applied composition was now 2 kg/m$^2$. Finally, the coated panel was dried in air at 20° C. for 2 weeks.

The surface of the coating was smooth and free from cracks.

The fire testing of the coated panel according to DIN 4102 gave the fire resistance class F 60.

EXAMPLE 2 (COMPARATIVE EXAMPLE)

The same coating composition as in Example 1 was prepared, but without the chlorinated paraffin component.

The surface of the panel provided with this coating composition was rough and traversed by fine cracks.

The fire testing of the coated panel according to DIN 4102 gave the fire resistance class F 30.

EXAMPLE 3 (COMPARATIVE EXAMPLE)

The same coating composition as in Example 1 was prepared, but without the chlorinated paraffin component. In addition, the film-forming binder Mowilith DM 230 (vinyl acetate-vinyl ester copolymer from Hoechst AG, Frankfurt) was replaced by ®Impranil DLP (anionic, aliphatic polyester-polyurethane dispersion from Bayer AG, Leverkusen).

The surface of the panel provided with this coating composition was rough and traversed by fine cracks.

The fire testing of the coated panel according to DIN 4102 did not meet the requirements of fire resistance class F 30.

EXAMPLE 4 (COMPARATIVE EXAMPLE)

The same coating composition as in Example 1 was prepared, but the film-forming binder Mowilith DM 230 was replaced by ®Impranil DLP.

The surface of the panel provided with this coating composition was smooth and free from cracks.

The fire testing of the coated panel according to DIN 4102 gave the fire resistance class F 30.

EXAMPLE 5 (COMPARATIVE EXAMPLE)

The same coating composition as in Example 1 was prepared, but the film-forming binder Mowilith DM 230 was replaced by ®Mowilith DM 60 (styrene-acrylate copolymer from Hoechst AG, Frankfurt).

The surface of the panel provided with this coating composition was smooth and free from cracks.

The fire testing of the coated panel according to DIN 4102 gave the fire resistance class F 30.

EXAMPLE 6 (COMPARATIVE EXAMPLE)

A coating composition analogous to that in Example 1 was prepared, with the film-forming binder Mowilith DM 230 being replaced by ®Mowilith DC (homopolymer based on vinyl acetate, from Hoechst AG, Frankfurt) and the chlorinated paraffin being replaced by tris(2-chloroethyl) phosphate.

The surface of the panel provided with this coating composition was smooth and free from cracks.

The fire testing of the coated panel according to DIN 4102 gave the fire resistance class F 30.

EXAMPLE 7
(according to the invention)

The same coating composition as in Example 1 was prepared, but instead of 2% by weight of chlorinated paraffin 1.5% by weight of a monoethanolammonium salt of the ®Knapsack cleaner component MPS, adjusted to a pH of 7, were used.

The surface of the panel coated with this coating composition was free from cracks and smoother than in the case of Example 1.

The fire testing of the coated panel according to DIN 4102 gave the fire resistance class F 60.

EXAMPLE 8
(according to the invention)

The same coating composition as in Example 1 was prepared, but instead of 2% by weight of chlorinated paraffin 1.5% by weight of a monoethanolammonium salt of the ®Knapsack phosphate MDE, adjusted to a pH of 7, were used.

The surface of the panel coated with this coating composition was free from cracks and smoother than in the case of Example 1.

The fire testing of the coated panel according to DIN 4102 gave the fire resistance class F 60.

EXAMPLE 9
(according to the invention)

The same coating composition as in Example 4 was prepared, but instead of 2% by weight of chlorinated paraffin 1.5% by weight of a monoethanolammonium salt of the ®Knapsack phosphate MDE, adjusted to a pH of 7, were used.

The surface of the panel provided with this coating composition was smooth and free from cracks.

The fire testing of the coated panel according to DIN 4102 gave the fire resistance class F 30.

EXAMPLE 10
(according to the invention)

The same coating composition as in Example 5 was prepared, but instead of 2% by weight of chlorinated paraffin 1.5% by weight of a monoethanolammonium salt of the ®Knapsack phosphate MDE, adjusted to a pH of 7, were used.

The surface of the panel provided with this coating composition was smooth and free from cracks.

The fire testing of the coated panel according to DIN 4102 gave the fire resistance class F 30.

EXAMPLE 11
(according to the invention)

The same coating composition as in Example 6 was prepared, but instead of 2% by weight of tris(2-chloroethyl) phosphate 1.5% by weight of a monoethanolammonium salt of the ®Knapsack phosphate MDE, adjusted to a pH of 7, were used.

The surface of the panel provided with this coating composition was smooth and free from cracks.

The fire testing of the coated panel according to DIN 4102 gave the fire resistance class F 30.

EXAMPLE 12
(according to the invention)

The same coating composition as in Example 5 was prepared, but instead of 2% by weight of chlorinated paraffin 1.5% by weight of a triethylammonium salt of the ®Knapsack phosphate MDE, adjusted to a pH of 7, were used.

The surface of the panel provided with this coating composition was smooth and free from cracks.

The fire testing of the coated panel according to DIN 4102 gave the fire resistance class F 30.

EXAMPLE 13
(according to the invention)

The same coating composition as in Example 5 was prepared, but instead of 2% by weight of chlorinated paraffin 1.5% by weight of a triphenylammonium salt of the ®Knapsack phosphate MDE, adjusted to a pH of 7, were used.

The surface of the panel provided with this coating composition was smooth and free from cracks.

The fire testing of the coated panel according to DIN 4102 gave the fire resistance class F 30.

EXAMPLE 14
(according to the invention)

The same coating composition as in Example 5 was prepared, but instead of 2% by weight of chlorinated paraffin 1.5% by weight of a tribenzylammonium salt of the ®Knapsack phosphate MDE, adjusted to a pH of 7, were used.

The surface of the panel provided with this coating composition was smooth and free from cracks.

The fire testing of the coated panel according to DIN 4102 gave the fire resistance class F 30.

EXAMPLE 15
(according to the invention)

The same coating composition as in Example 1 was prepared, but instead of 2% by weight of chlorinated paraffin 1.5% by weight of a diethanolammonium salt of the ®Knapsack cleaner component MPS, adjusted to a pH of 7, were used.

The surface of the panel provided with this coating composition was free from cracks and smoother than in the case of Example 1.

The fire testing of the coated panel according to DIN 4102 gave the fire resistance class F 60.

EXAMPLE 16
(according to the invention)

The same coating composition as in Example 1 was prepared, but instead of 2% by weight of chlorinated paraffin 1.5% by weight of a triethanolammonium salt of the ®Knapsack cleaner component MPS, adjusted to a pH of 7, were used.

The surface of the panel provided with this coating composition was free from cracks and smoother than in the case of Example 1.

The fire testing of the coated panel according to DIN 4102 gave the fire resistance class F 60.

We claim:

1. An expandable, flame-retardant coating composition comprising:

from 4 to 25% by weight of a film forming binder selected from the group consisting of a vinyl acetate-vinyl ester copolymer, an anionic, aliphatic polyester-polyurethane, a styrene-acrylate copolymer, a homopolymer based on vinyl acetate, and mixtures thereof;

from 10 to 40% by weight of ammoniumpolyphosphate;

from 8 to 40% by weight of at least one substance which is carbonized under the effect of heat and which contains an ammonium salt of a mono- or dialkylphosphate or mixture thereof;

from 6 to 25% by weight of expansion agent;

from 0 to 25% by weight of fillers; and from 0 to 5% by weight of dispersants.

2. A coating composition as claimed in claim 1, wherein the ammonium salt of the mono- or dialkylphosphate is monoethanolamine, diethanolamine or triethanolamine.

3. A coating composition as claimed in claim 1, wherein the ammonium salt of the mono- or dialkylphosphate is a $C_1$–$C_6$-alkyl-substituted ammonium salt.

4. A coating composition as claimed in claim 1, wherein the ammonium salt of the mono- or dialkylphosphate is an aryl-substituted ammonium salt.

* * * * *